July 14, 1936.  S. BLICKMAN  2,047,190
APPARATUS FOR USE IN WELDING PARTITIONS
Filed May 29, 1934   3 Sheets-Sheet 1
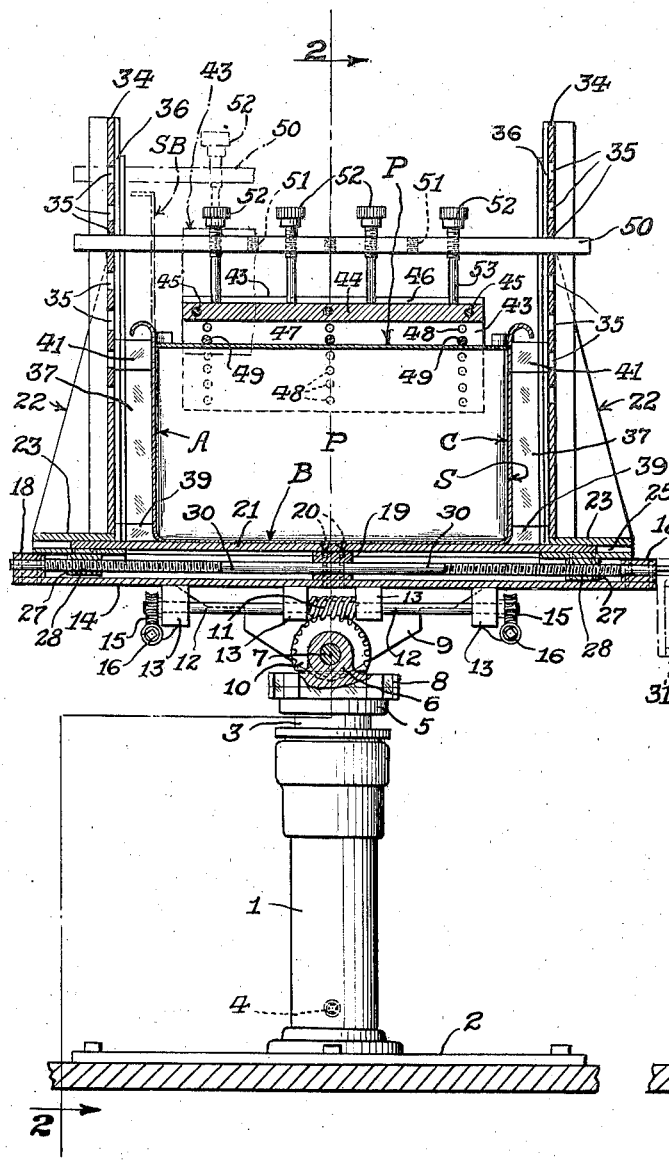
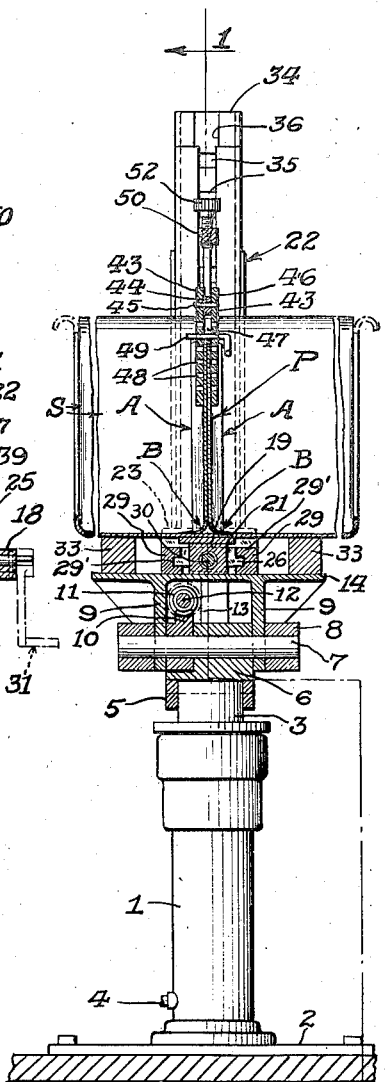
INVENTOR.
SAUL BLICKMAN
BY 
ATTORNEY.

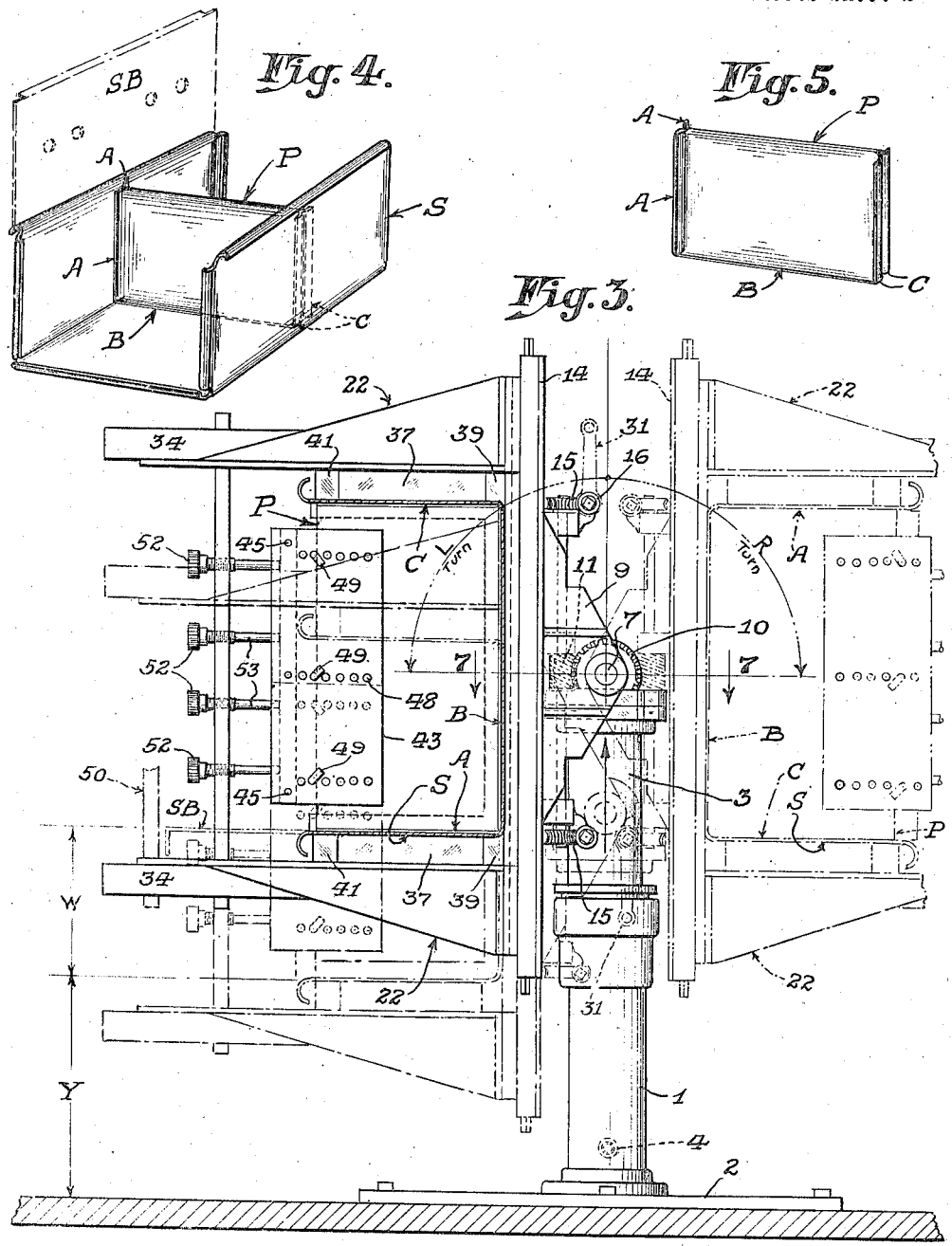

July 14, 1936.  S. BLICKMAN  2,047,190
APPARATUS FOR USE IN WELDING PARTITIONS
Filed May 29, 1934  3 Sheets-Sheet 3
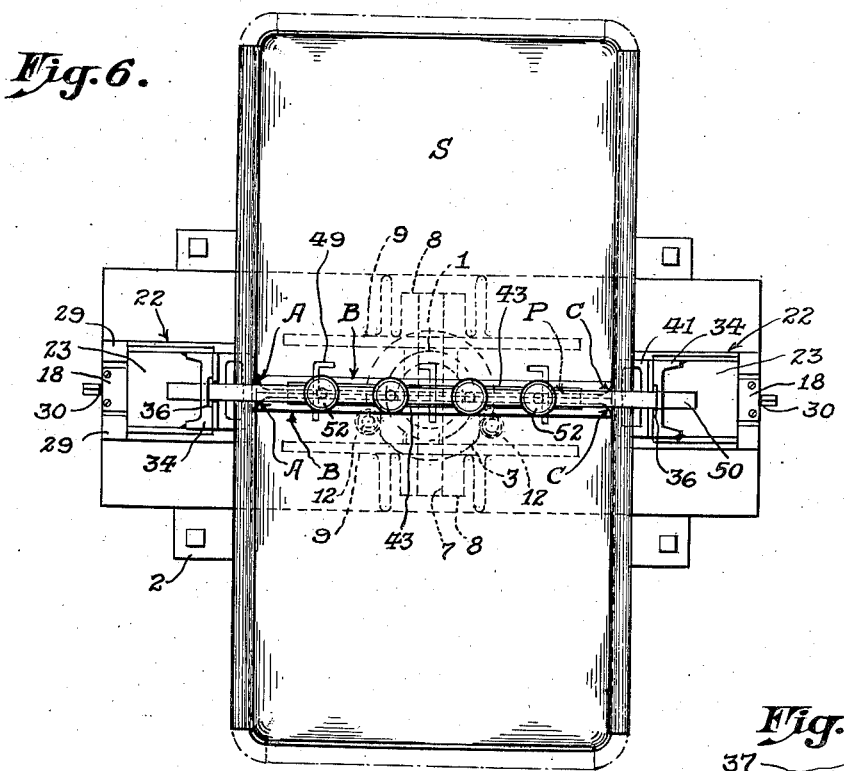
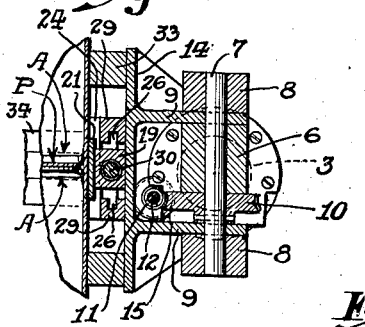
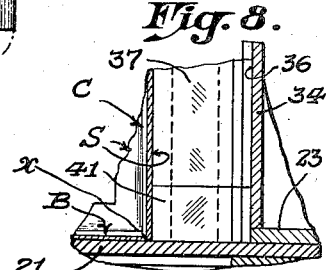
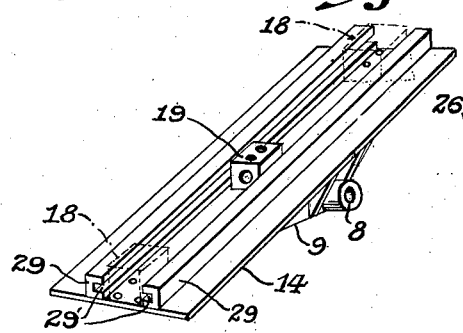
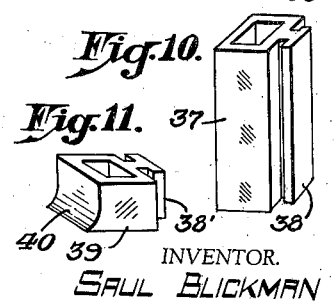
INVENTOR.
SAUL BLICKMAN
BY
ATTORNEY.

Patented July 14, 1936

2,047,190

UNITED STATES PATENT OFFICE 2,047,190

APPARATUS FOR USE IN WELDING PARTITIONS

Saul Blickman, New York, N. Y.

Application May 29, 1934, Serial No. 728,192

12 Claims. (Cl. 113—99)

This invention relates to improvements in apparatus for use in welding, and is particularly though not exclusively adapted for use in welding partitions or similar plates into structures, such as disclosed in my copending application, Serial No. 624,839.

In my said copending application, I have disclosed a sheet metal sink including a bottom and four walls with a partition extending between two of the walls and across the bottom to divide the sink into two compartments. The sink forming the subject matter of my said application is provided with rounded corners as is also the partition, which is formed of two plates or walls having a rounded top and flaring marginal portions integrally united on opposite sides to the opposite walls and the bottom of the sink.

The object of the present invention is to provide means to facilitate the positioning and clamping of the partition in such structures, regardless, of whether the corners be rounded or sharp, for the welding operation.

More specifically the invention aims to provide means to facilitate the welding of the partitions by providing means to move the sink and partition as a unit to different positions most convenient to the welder and conducive to the production of neat joints.

The foregoing and other objects and advantages of the invention will become apparent and will be pointed out during the course of the following detailed description of the accompanying drawings wherein Fig. 1 is a view taken on the line 1—1 of Fig. 2;

Fig. 2 is a view taken on the line 2—2 of Fig. 1;

Fig. 3 is a front elevation illustrating different positions of the apparatus;

Fig. 4 is a perspective view of a formed up blank of a sink with a partition inserted therein;

Fig. 5 is a perspective view of the partition shown in Fig. 4;

Fig. 6 is a top plan view of the apparatus with a sink and partition mounted thereon;

Fig. 7 is a view taken on the line 7—7 of Fig. 3;

Fig. 8 is a sectional view of a fragment of a square cornered sink and partition and fragments of the clamping means therefor;

Figs. 9, 10 and 11 are perspective views of different types of clamping blocks;

Fig. 12 is a perspective view of the platform on which the clamping means is mounted; and Fig. 13 is a perspective view of one of the clamping supports.

In my copending application, Serial No. 624,839, I have disclosed a sink wherein opposite walls, such as the front and back, are bent up from the bottom and then formed with marginal portions to be welded to end panels to complete the structure. This is generally similar to the structure shown in Fig. 4 of the present application. Also in my said copending application I have shown a partition member which may be used to divide the sinks and being generally similar to the partition as shown in Figs. 4 and 5 of the present application, that is, composed of parallel plates united at their tops and formed at the bottom and ends with marginal portions to be united to the walls of the sink and to form rounded corners therewith.

In welding this partition member in the sink, it is preferable to position the same relative to the parts to which it is to be welded, and perform the welding before the panels are inserted at the ends of the sink, as this more readily permits the welder to apply the torch along the bottom marginal portions of the partition with the sink in a horizontal position. In fact the neatest joints are obtained in welding articles of this kind where the torch is applied to the portions to be welded while they are in a horizontal position, due to the even flow of metal in such position. In welding the partitions such as shown in Fig. 4 within the sink, it is necessary to apply the torch along six marginal edges of the partition, three on each side. It is also necessary to firmly clamp the partition in proper position for the welding and to hold it in such position during the welding.

With the foregoing in mind, I have provided, as shown in Figs. 1, 2 and 3, a cylindrical standard 1 mounted on the base 2 and containing a plunger 3 which may be raised and lowered by any suitable means, such as fluid pressure applied through a pipe 4 and leading from any suitable source. The plunger supports the apparatus for holding the sink and partition during the welding operation. A collar 5 is secured to the top of the plunger 3 and to a bearing block 6 through which is journaled a shaft 7. Collars 8 for the ends of the shaft 7 are secured to depending walls or flanges 9 of a platform presently described, and the shaft 7 is rotatably mounted through openings in the flanges 9. The shaft 7 also is journaled through a semi-circular toothed track 10, the flat end of which rests on collar 5, and the teeth of which mesh with a worm 11 keyed to a shaft 12 which is journaled through lugs 13 depending from the platform 14. Each of the outer ends of the shaft 12 may have keyed thereto a gear wheel 15 meshing with a worm on the shaft 16, which may be operated by a hand crank for the purpose hereinafter described. The platform 14 has secured to the ends thereof journal blocks 18 (see also Fig. 12) each having an unthreaded bore extending therethrough. Another block 19 is attached, as by screws 20, to the platform 14 and to a fixed plate 21 above the platform. Standards 22, shown in detail in perspective in Fig. 13, are each provided on their bottoms with a plate 23 which rests on and is secured to a U-shaped plate 24 providing in conjunction with the plate 23 channels 25 which receive the ends of plate 21. A pair of L-shape plates 26 depend from the plates 24 and have secured therebetween and to the plate 24, blocks 27, each provided with a screw threaded bore 28. As shown best in Figs. 2 and 12, on top of the platform 14 are plates 29 provided with grooves 29' which slidably receive the ends of the plates 26.

A shaft 30 has an unthreaded central portion journaled through the block 19 and unthreaded ends journaled through the blocks 18. The shaft 30 also has oppositely screw threaded portions mounted through the openings 28 in the blocks 27, and a handle 31 may be placed on the outer ends of the shaft 30 to rotate the same. This same handle may be used to rotate shaft 12. Since the screw threads on the shaft 30 and in the opposite blocks 27 are reversed, rotation of the handle 31 in one direction will cause the standards 22 to be moved toward each other simultaneously due to the movement of the blocks 27 along the shaft. The blocks 27, of course, also move the plates 26 in the grooves in the plates 29. Rotation of the handle in the opposite direction will cause the standards to be moved apart.

When a partition such as shown in Fig. 5 and designated generally by the letter P, and having the marginal portions A, B and C, is to be welded in a sink S in the position shown in Fig. 4, the sink is placed on top of the plate 21 with the center or other line along which the partition is to extend immediately above the plate 21. The platform 14 of course is in horizontal position at this time. Blocks or plates 33 are inserted between the bottom of the sink and the top of the platform 14 as shown in Fig. 2, the blocks being of a thickness corresponding to the distance between the top of the plate 21 and the top of the platform 14.

It is now necessary to insert the partition and clamp it and the sink against lateral movements. To this end the standards 22 are provided in their walls 34 with alined openings 35. The standards are also provided with channels 36 adapted to removably receive clamping blocks, such as shown in detail in Figs. 9, 10 and 11. In Fig. 10 the block 37 is shown as being of rectangular shape in cross section, relatively long, and hollow. It is provided with a T-shaped rib 38 adapted to fit in the channels 36. The smaller block shown in Fig. 11 is also substantially rectangular and is also provided with a rib 38', similar to the rib 38. The block 39 of Fig. 11 is provided on its face opposite the rib 38', with a curved wall 40 of substantially the same curvature as the rounded bottom corners of the sink. Shorter blocks, such as shown in Fig. 9, of the same cross sectional shape and size as the blocks 37 but of shorter length and designated by the numeral 41, are also provided with T-shaped ribs 38''. If the sink is positioned on the plate 21 with the blocks 33 between the sink and the platform 14, the standards 22 may be moved apart a sufficient distance to permit the blocks 39 and 37 to be connected with the standards 22 by sliding them downwardly with the ribs 38', 38 in the channels 36. If the sink be of such a height that blocks 37 are not tall enough to come to the approximate top, that is, under the rim if the sink has one as shown, then smaller blocks 41 may also be inserted on top of the blocks 37, as shown in Fig. 1. The standards 22 are then moved toward each other until the blocks 37, 40, 41 press firmly against the sides of the sink in alinement with the partition if the partition has already been inserted.

Another way of making the assembly and clamping the sink would be to connect the clamping blocks 40, 37, 41, to the standards before the sink is placed on the plate 21, and then moving the standards further apart to permit insertion of the sink if necessary and then move them toward the sink. The partition may then be inserted in the proper place with the marginal portions B resting on the bottom of the sink in alinement with the plate 21 and with the marginal portions A and C engaging opposite walls of the sink in alinement with the blocks 40, 37, 41.

The remaining step is to clamp the partition firmly down in the sink. To this end I provide a pair of plates 43 between which is a spacer block or plate 44. The plates 43 and 44 are firmly connected either by rivets 45, by welding or other suitable means. Between the upper ends of the plates 43, above the plate 44, is a channel 46, and below the plate 44 between the plates 43 is a deeper channel 47. Each of the plates 43 is provided with a plurality of alined rows of openings 48 adapted to receive rods 49 to extend across the channels 46. The openings 35 in standards 22 are adapted to receive a plate 50 having a plurality of screw threaded openings 51 to receive screws 52 preferably provided with relatively long unthreaded shanks 53 which engage in the channel 46.

After clamping the sink on the support and between the standards, and, of course, after properly positioning the partition in the manner previously described, the plates 43, 44, are positioned over the top of the partition with the top of the partition in the channel 47. The rods 49 are placed in the openings 48 in alinement with each other according to the height of the partition. The plate 50 is inserted through selected openings 35 in the standards 22 and the screws 52 are tightened down to bear against the plate 44 to force it and the plates 43 downwardly, consequently forcing the rods 49 against the top of the partition to firmly hold it in place. The parts are now ready for the first welding step, wherein the torch is applied along the marginal portions B of the partition and the bottom of the sink with the sink in the horizontal position shown in Fig. 1. When this welding step is completed, the rod 12 is rotated to cause the worm to travel on the arcuate toothed rack 10 to tilt the platform 14 and the parts thereabove, including the sink and partition, to the left of the position shown in Fig. 1, until the platform 14, plate 21, and bottom of the sink are in substantially vertical position, which places the sides of the sink in a horizontal position with the marginal portions A also horizontally disposed. This is shown in Fig. 3, and I would point out that when the platform and sink are completely turned, the left wall of the sink is nearer to the floor than was the bottom of the sink during the first welding operation. This is due to the fact that the center of the bottom of the sink after it is turned is below the axis on which the structure turns, namely, shaft 7. Such position of the side of the sink may be inconvenient to the welder, so the plunger 3 may then be raised to move the structure up. This may be noted in Fig. 3 where the distance Y between the arrows represents the distance of the wall along which the welding is to be done from the floor after the structure was tilted from the position of Fig. 1, and the distance between the arrows W represents the distance which the structure is raised by the plunger to place the side wall at substantially the same level which the bottom wall of the sink was in during the first welding step. The welder may now proceed working with his torch along the marginal portions A, and when these have been welded he rotates the shaft 12, to tilt the structure from the left to the right to place it in the dotted line position of Fig. 3, so that the marginal portions C are then horizontal and can be conveniently welded. Of course the sequence of positions is not important as either the marginal portions A or C may first be welded, then the portions B, and then the other of the portions A or C.

In Fig. 4 I have shown a splash-board SB in dot and dash lines above one wall of the sink. If the sink was of such construction, it would be necessary, in clamping the partition on its support, to place the plate 50 in the top openings 35 as also shown in dot and dash lines in Fig. 1, to clear the top of the splash-board. In such case the rods 49 would be removed from the upper openings 48 of plates 43 and placed in lower openings to compensate for the raising of the plate 50.

Some sinks have relatively sharp or squared corners instead of rounded corners, and the joints between the partitions in such sinks are also sharp or squared. When welding a partition in this type of sink, I would replace the blocks 40 of Fig. 11 with blocks 41 of Fig. 9 at the bottom of the walls, as shown in Fig. 8, so that the sharp corner of the block 41 would be flush with the corner X of this type of sink. Otherwise, the clamping and welding operations and the tilting of the structure would be the same as previously described.

Regardless of the type or character of sink and partition, after the welding is accomplished, the screws 52 are unloosened, the plates 43 and 44 removed, the handle 31 is applied to shaft 30 and turned to move the standards 22 and clamping blocks 37, 40, or the like, away from the walls of the sink, so that the sink can be removed from the plate 21. Of course in actual practice it is quite usual to weld successively a number of sinks and partitions of the same size, so that the clamping and unclamping is accomplished very quickly without the need of adjustments for different sizes of sinks. It is only when a different type or size of sink and partition, particularly in respect to height, is to be welded that the rods 49 need be changed in the openings 48 of the plate 43.

I claim:—

1. Apparatus for use in welding partitions in structures of the character described comprising a support for the bottoms of the structures, means to engage the tops of the partitions and to hold the same firmly against the bottoms of the structures and between opposite walls thereof, means to clamp the said walls on their outer surfaces in alinement with the plane of the partition, and means to move the support, structure and partition as a unit to selectively position the said opposite walls in a substantially horizontal plane with the edges of the partition to be welded to said walls also in a substantially horizontal plane.

2. Apparatus for use in welding partition plates to opposite walls and bottoms of metal sinks and similar structures comprising, a support for the bottoms of the structures, means movable along said support to clamp the opposite walls of the structures on their outer surface in alinement with the plane of the partition plates to be welded thereto, and means supported by said clamping means to engage the upper edges of the partition plates and to force the lower edges thereof against the bottoms and the bottoms against the support.

3. Apparatus for use in welding partition plates to opposite walls and bottoms of metal sinks and similar structures comprising, a support for the bottoms of the structures, means movable along said support to clamp the opposite walls of the structures on their outer surface in alinement with the plane of the partition plates to be welded thereto, and means to engage the upper edges of the partition plates and to force the lower edges thereof against the bottoms and the bottoms against the support.

4. Apparatus for use in welding partition plates to opposite walls and bottoms of metal sinks and similar structures comprising, a support for the bottoms of the structures, means movable along said support to clamp the opposite walls of the structures on their outer surface in alinement with the plane of the partition plates to be welded thereto, and means supported by said clamping means and adjustable thereon with respect to said support and the tops of the partition plates to engage the upper edges of the partition plates and to force the lower edges thereof against the bottoms and the bottoms against the support.

5. Apparatus for use in welding partition plates to opposite walls and bottoms of metal sinks and similar structures comprising, a support for the bottoms of the structures, means movable along said support to clamp the opposite walls of the structures on their outer surface in alinement with the plane of the partition plates to be welded thereto, means supported by said clamping means to engage the upper edges of the partition plates and to force the lower edges thereof against the bottoms and the bottoms against the support, and means to tilt said support, the structure thereon and the partitions therein as a unit to bring the different edges of the partition plates and the walls to which said edges are to be welded selectively into substantially horizontal planes.

6. Apparatus for use in welding partition plates to opposite walls and bottoms of metal sinks and similar structures comprising, a support for the bottoms of the structures, means movable along said support to clamp the opposite walls of the structures on their outer surfaces in alinement with the plane of the partition plates to be welded thereto, means supported by said clamping means to engage the upper edges of the partition plates and to force the lower edges thereof against the bottoms and the bottoms against the support, means to tilt said support, the structure thereon and the partitions therein as a unit to bring the different edges of the partition plates and the walls to which said edges are to be welded selectively into substantially horizontal planes, and means to raise and lower said support and the parts thereon.

7. Apparatus for use in welding partition plates to the opposite walls and bottoms of metal sinks and similar structures comprising, a tiltable platform, a pair of alined standards extending above the platform and slidable thereon toward and away from each other, means engageable with said standards to abut the outer surfaces of the opposite walls in alinement with the planes occupied by the partition plates, and means supported by said standards to engage the upper edges of the partition plates and to force the plates downwardly against the bottom of the structure to which they are to be welded.

8. Apparatus for use in welding partition plates to the opposite walls and bottoms of metal sinks and similar structures comprising, a tiltable platform, a pair of alined standards extending above the platform and slidable thereon toward and away from each other, means engageable with said standards to abut the outer surfaces of the opposite walls in alinement with the plane occupied by the partition plates, means supported by said standards to engage the upper edges of the partition plates and to force the same downwardly against the bottom of the structure to which it is to be welded, and means to raise and lower said platform and the parts carried thereby.

9. In apparatus for use in welding partition plates to the opposite walls and bottoms of metal sinks or similar structures comprising a base, an arcuate toothed rack on said base, a platform, a worm rotatably supported by said platform with its teeth in mesh with the teeth of the arcuate rack, means to rotate said worm to cause said platform to be tilted to desired positions as the worm travels along the rack, and means on said platform for supporting the structure and partitions to be welded.

10. In apparatus for use in welding partition plates to the opposite walls and bottoms of metal sinks or similar structures comprising a base, an arcuate toothed rack on said base, a platform, a worm rotatably supported by said platform with its teeth in mesh with the teeth of the arcuate rack, means to rotate said worm to cause said platform to be tilted to desired positions as the worm travels along the rack, means on said platform for supporting the structure and partitions to be welded, and means to raise and lower said rack, worm, and platform.

11. Apparatus for use in welding partitions in structures of the character described comprising a support for the structure into which the partition is to be welded, means to engage an end of the partition to hold the same firmly against the intermediate wall of the structure and between opposite walls connected by said intermediate wall, means to clamp said opposite walls on their outer surfaces in alinement with the plane of the partition, and means to move the support, structure and partition as a unit to selectively position the said opposite walls in a substantially horizontal plane with the edges of the partition to be welded to said walls also in a substantially horizontal plane.

12. Apparatus for use in welding partition plates to opposite walls and an intermediate connecting wall of metal structures of the character described comprising, a support for the structures, means movable along said support to clamp said opposite walls of the structures on their outer surfaces in alinement with the plane of the partition plates to be welded thereto, and means supported by said clamping means to engage the upper edges of the partition plates and to force the lower edges thereof against the said intermediate walls of the structures.

SAUL BLICKMAN.